United States Patent
Miyanaga (10) Patent No.: US 11,213,898 B2
(45) Date of Patent: Jan. 4, 2022

(54) DRILLING DEVICE FOR ENLARGED-DIAMETER HOLE

(71) Applicant: KABUSHIKI KAISHA MIYANAGA, Miki (JP)

(72) Inventor: Masaaki Miyanaga, Miki (JP)

(73) Assignee: KABUSHIKI KAISHA MIYANAGA, Miki (JP)

(\*) Notice: Subject to any disclaimer, the term of this patent is extended or adjusted under 35 U.S.C. 154(b) by 0 days.

(21) Appl. No.: 16/967,964

(22) PCT Filed: Feb. 4, 2019

(86) PCT No.: PCT/JP2019/003878
§ 371 (c)(1),
(2) Date: Aug. 6, 2020

(87) PCT Pub. No.: WO2019/159740
PCT Pub. Date: Aug. 22, 2019

(65) Prior Publication Data
US 2021/0031276 A1    Feb. 4, 2021

(30) Foreign Application Priority Data
Feb. 14, 2018 (JP) .............................. JP2018-023859

(51) Int. Cl.
*B23B 51/00* (2006.01)
*B28D 1/14* (2006.01)

(52) U.S. Cl.
CPC ............ *B23B 51/0018* (2013.01); *B28D 1/14* (2013.01); *Y10T 408/8588* (2015.01)

(58) Field of Classification Search
CPC ............ B23B 51/0018; B23B 51/0027; B23B 51/0045; B28D 1/14
See application file for complete search history.

(56) References Cited

U.S. PATENT DOCUMENTS 2,168,176 A * 8/1939 Shaw .................. B23B 51/0045
82/1.5
3,146,641 A * 9/1964 Benjamin ......... B23B 29/03485
82/1.2
(Continued)

FOREIGN PATENT DOCUMENTS

CN         201342497 Y    11/2009
CN         105952380 A     9/2016
(Continued)

*Primary Examiner* — Eric A. Gates
(74) *Attorney, Agent, or Firm* — Alleman Hall Creasman & Tuttle LLP (57) ABSTRACT

A drilling device for forming an enlarged-diameter hole includes: a guide sleeve with a cylindrical body and a guide to be inserted into a bottomed hole; a slide body that slides in the cylindrical body; and a bit holder provided on the slide body swingably; and a diameter-enlarging bit with a cutting blade. The bit slides between a first position where the cutting blade is separated from a bottom of the bottomed hole and a second position where the cutting blade is closer to the bottom than that at the first position. The guide has: a guide piece that guides the cutting blade to a side part, of the bottomed hole, following an advance of the bit from the first position to the second position; and an opening which allows passage of the bit removed from the bit holder where the bit is at the first position.

4 Claims, 8 Drawing Sheets

(56) References Cited

U.S. PATENT DOCUMENTS

| | | | |
|---|---|---|---|
| 4,502,554 A | | 3/1985 | Jones |
| 4,586,573 A | * | 5/1986 | Jones .................. E21B 10/32 |
| | | | 175/211 |
| 4,992,010 A | * | 2/1991 | Fischer ............... B23B 51/0045 |
| | | | 175/286 |
| 6,857,344 B1 | * | 2/2005 | Diller ................ B23B 29/03453 |
| | | | 408/57 |
| 2009/0139772 A1 | * | 6/2009 | Miyanaga ........... B23B 51/0045 |
| | | | 175/265 |
| 2011/0303057 A1 | * | 12/2011 | Craig ............... B23B 29/03453 |
| | | | 82/1.2 |
| 2016/0207222 A1 | * | 7/2016 | Miyanaga ............... B23B 51/08 |
| 2019/0160707 A1 | | 5/2019 | Miyanaga |

FOREIGN PATENT DOCUMENTS

| | | | | |
|---|---|---|---|---|
| CN | 205669379 U | | 11/2016 | |
| EP | 0791423 A1 | * | 8/1997 | ......... B23B 51/0045 |
| GB | 518688 A | * | 3/1940 | ......... B23B 51/0045 |
| JP | 03002491 A | * | 1/1991 | |
| JP | 2018001690 A | | 1/2018 | |

\* cited by examiner

First position

Second position

DRILLING DEVICE FOR ENLARGED-DIAMETER HOLE

TECHNICAL FIELD

The present invention relates to a drilling device for forming an enlarged-diameter hole having an enlarged hole diameter in an inner part of a bottomed hole previously formed in an object to be drilled.

BACKGROUND ART

Figure 9A:
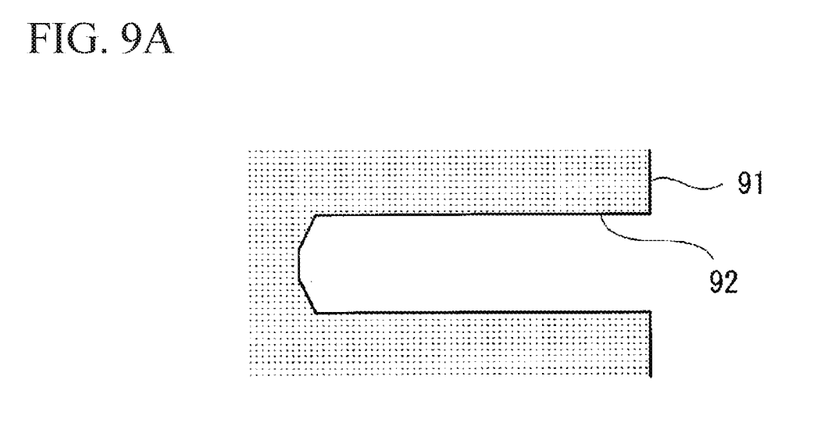
FIG. 9A shows a pore before an enlarged-diameter hole is formed.
Figure 9B:
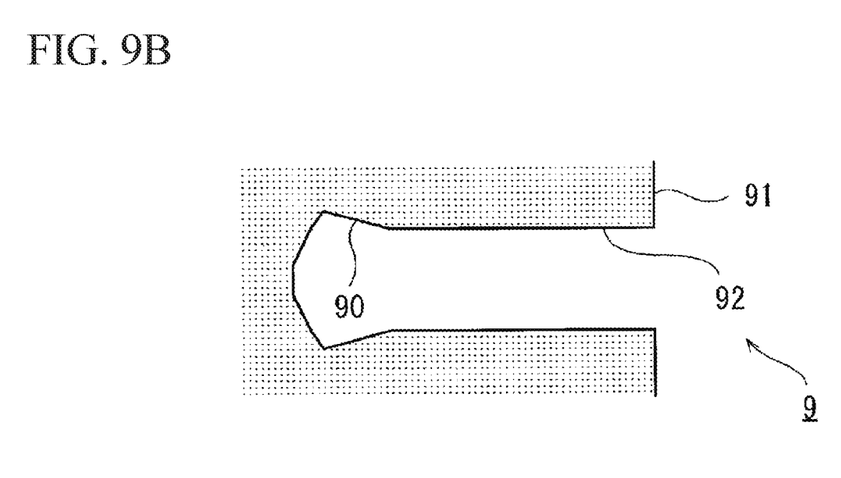
FIG. 9B shows a mounting hole in which the enlarged-diameter hole is formed.

When another part or structure is attached to an object to be drilled such as a concrete wall, a method of fixing an anchor bolt inside a bottomed mounting hole opened on a concrete wall surface and attaching the other part or structure to the anchor bolt has been widely practiced. As shown in FIG. 9B, a mounting hole 9 includes a bottomed pore 92 opened toward a wall surface 91 and an enlarged-diameter hole 90 formed at an inner bottom of the pore 92. The anchor bolt has a head with an enlarged diameter, and the head fits into the enlarged-diameter hole 90. In the following description, a direction toward the inner part of the mounting hole 9 is the front, and an opposite direction is the rear.

Figure 8:
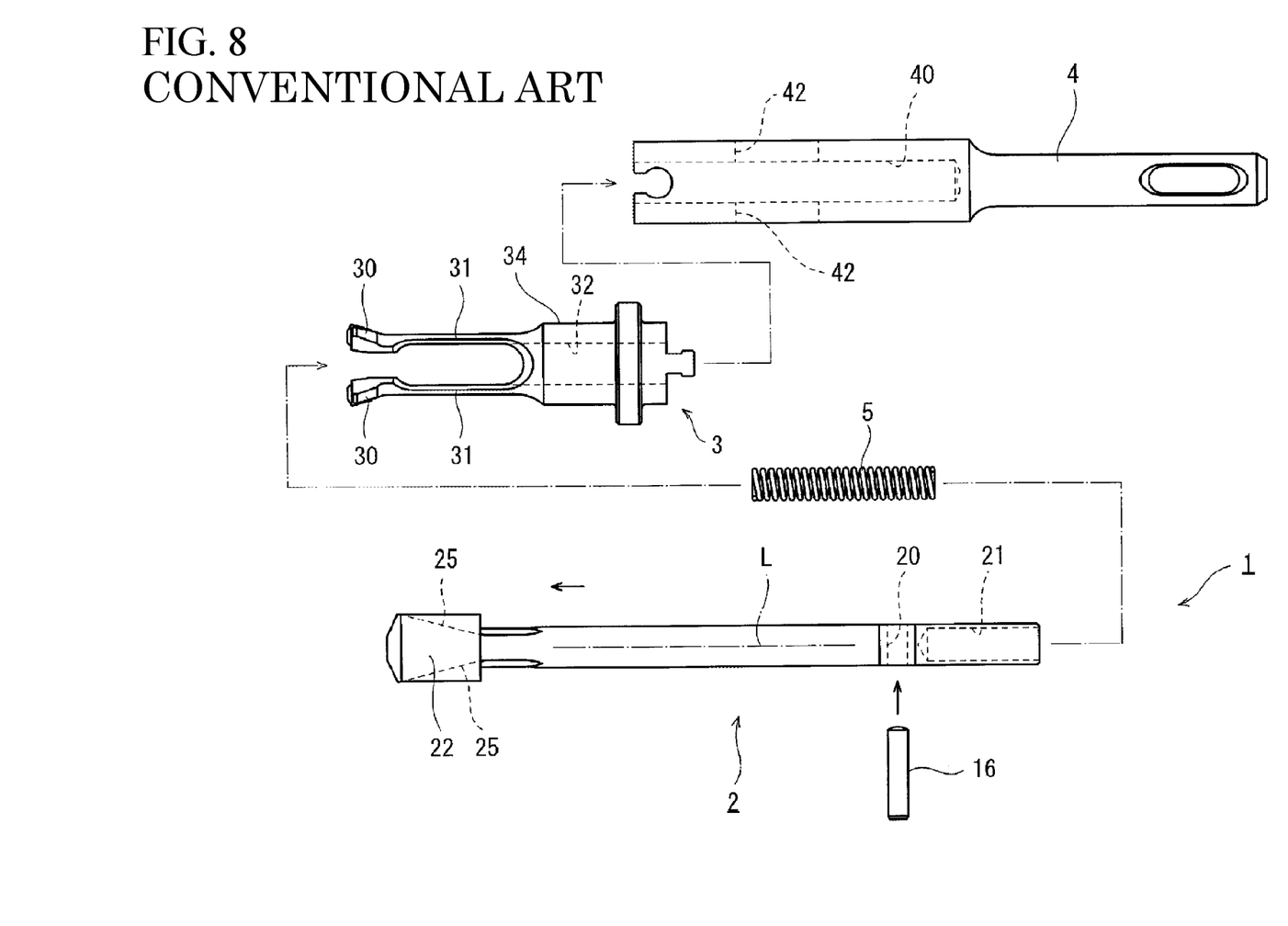
FIG. 8 is an exploded side view of a conventional drilling device.

Various drilling devices for drilling the mounting hole have been proposed, and the applicant also discloses the one shown in PTL 1. FIG. 8 is an exploded side view of a conventional drilling device 1. The drilling device 1 includes a shaft 2 called a bow jaw having an enlarged-diameter guide block 22 provided at a front end thereof, a cutting body 3 where a see-through hole 32, into which the shaft 2 fits, is opened at a center and a plurality of cutting blades 30 is provided at a tip, and a shank 4 connected to the cutting body 3 and in which an insertion hole 40 communicating with the see-through hole 32 and receiving the shaft 2 is opened inside. The shaft 2 passes through the cutting body 3 and the shank 4. The shaft 2 has a spring receiving hole 21 opened at a rear end thereof and a through hole 20 orthogonal to an axis L opened on a front side of the spring receiving hole 21. Tapered surfaces 25 that expand forward are formed in the enlarged-diameter guide block 22.

The cutting body 3 is configured by projecting a leg piece 31 forward from a front end of a cutting body main body 34 in which the above see-through hole 32 is opened. The cutting blade 30 is provided at a tip of each leg piece 31. A long hole 42 that overlaps the through hole 20 is opened on a side surface of the shank 4. The shaft 2 is inserted into the insertion hole 40 of the shank 4 through the see-through hole 32 of the cutting body 3, and in this state, a fixing pin 16 is inserted into the long holes 42 and the through hole 20 from the outside of the shank 4. A compression spring 5 is provided between the insertion hole 40 of the shank 4 and the spring receiving hole 21 of the shaft 2, and the shaft 2 is biased forward and the shank 4 is biased rearward by the compression spring 5.

When the drilling device 1 is continuously used, the cutting blades 30 will be worn, so that the cutting body 3 needs to be replaced. In this case, the fixing pin 16 is pulled out from the shank 4 and the shaft 2 to release an engagement state between the shank 4 and the shaft 2. Next, the shaft 2 is pulled out from a front end of the shank 4, and the shank 4 and the cutting body 3 are disconnected. The cutting body 3 is replaced, and an operation in a reverse order of the above is performed to assemble the drilling device 1.

CITATION LIST

Patent Literature

PTL 1: JP 2018-1690A

SUMMARY OF INVENTION

Technical Problem

In the drilling device shown in PTL 1, in order to replace the cutting body 3, three steps of releasing the engagement state between the shank 4 and the shaft 2, pulling out the shaft 2 from the front end of the shank 4, and disconnecting the shank 4 and the cutting body 3 are required. The applicant has conceived that the cutting body is replaced more quickly to make drilling work more efficient. An object of the present invention is to provide a drilling device capable of quickly replacing a cutting body.

Solution to Problem

A drilling device for forming an enlarged-diameter hole in a deep bottom of a bottomed hole opened in an object to be drilled, the drilling device including: a guide sleeve including a guide to be inserted into the bottomed hole and a cylindrical body continuous with the guide; a slide body provided so as to be movable back and forth in the cylindrical body; and a bit holder located in front of the slide body and provided on the slide body so as to be swingable in the cylindrical body; a diameter-enlarging bit located in front of the bit holder, detachably fitted to the bit holder, and provided with a cutting blade at a front end, in which following the back and forth movement of the slide body, the diameter-enlarging bit is provided so as to be movable back and forth between a first position at which the cutting blade is separated from a bottom of the bottomed hole and a second position at which the cutting blade is closer to the bottom of the bottomed hole than the cutting blade at the first position, and the guide has a guide piece that guides the cutting blade to a side surface part, of the bottomed hole, corresponding to the enlarged-diameter hole following an advance of the diameter-enlarging bit from the first position to the second position, and an opening formed with a size allowing passage of the diameter-enlarging bit removed from the bit holder.

Advantageous Effects of Invention

At the time of forming enlarged-diameter hole

In a state in which the guide is inserted in the bottomed hole, the slide body is pushed forward while rotating the slide body, and the diameter-enlarging bit is advanced from the first position to the second position. The cutting blade is guided to the side surface of the bottomed hole along the guide piece. The diameter-enlarging bit is swingably provided on the slide body via the bit holder, and therefore it swings with respect to the slide body. The cutting blade is allowed to move toward the side surface of the bottomed hole corresponding to the enlarged-diameter hole, and reaches the second position.

At the time of replacing diameter-enlarging bit

The diameter-enlarging bit is set to the first position, and the diameter-enlarging bit detachably fitted to the bit holder is removed from the bit holder. Since the opening is formed with the size that allows passage of the diameter-enlarging bit, the diameter-enlarging bit to be replaced can be taken out from the drilling device through the opening. Replacement of the diameter-enlarging bit is completed by attaching a replacement diameter-enlarging bit to the bit holder through the opening.

In the drilling device according to the present invention, the diameter-enlarging bit, which is a cutting body, can be replaced by simply attaching and detaching the diameter-enlarging bit to and from the bit holder through the opening. As a result, the cutting body can be quickly replaced and drilling work can be made efficient.

DESCRIPTION OF EMBODIMENTS

Hereinafter, an embodiment of the present invention will be described in detail with reference to the drawings. First, a hole formed by a drilling device of the present invention will be described. As shown in FIG. 9A, a bottomed cylindrical pore 92 is initially opened in an object 91 to be drilled, such as a concrete wall, by a general drill. The drilling device according to the present embodiment is a drilling device for forming an enlarged-diameter hole 90 shown in FIG. 9B at an inner bottom of the pore 92. By inserting an anchor bolt (not shown) having an enlarged head into a mounting hole 9 having such an enlarged-diameter hole 90 at an inner part of the pore 92, the anchor bolt has increased pull-out strength. In particular, when the object 91 to be drilled is a ceiling of a structure or the like, this pull-out prevention effect is high.

Figure 1:
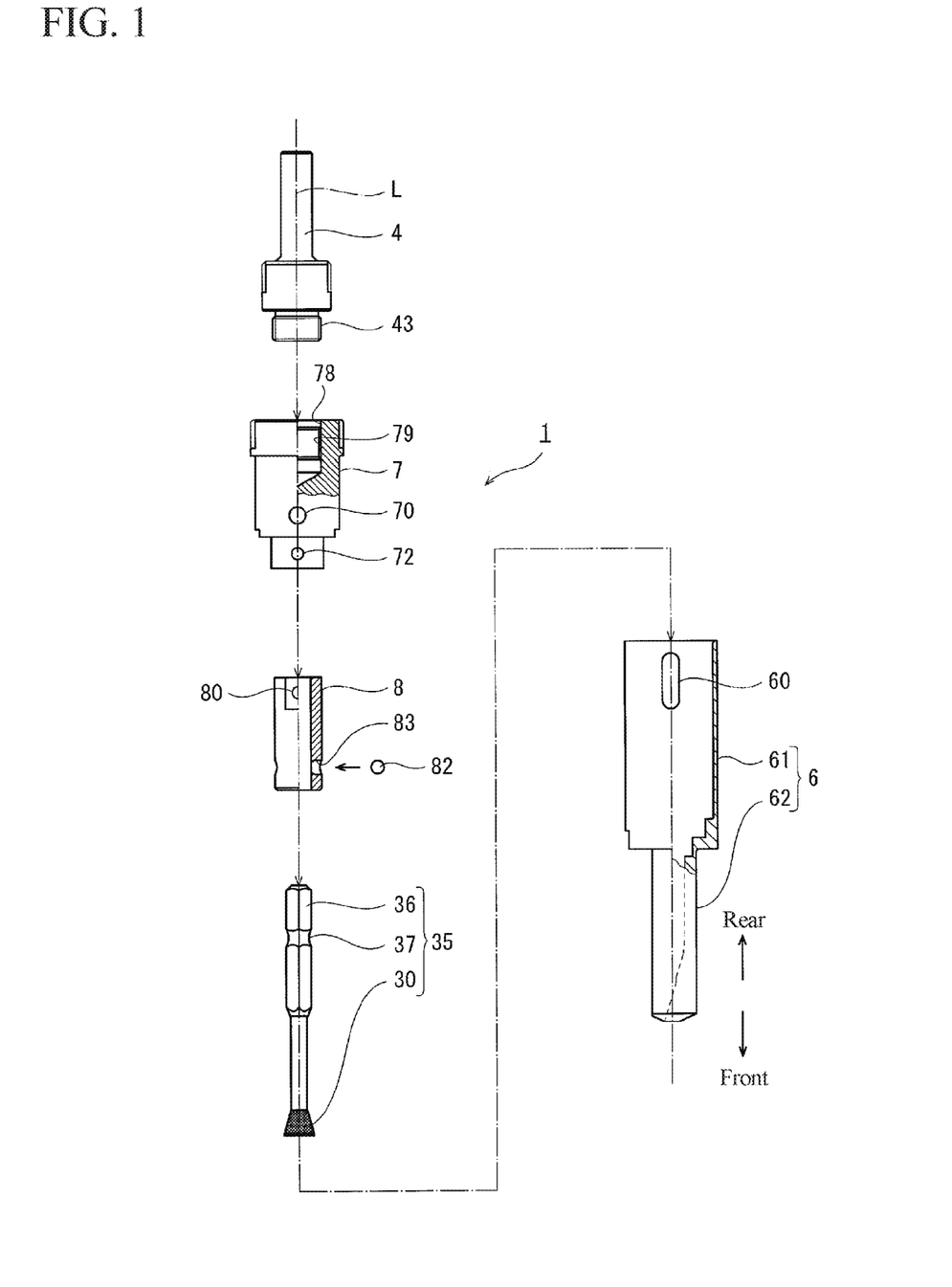
FIG. 1 is an exploded front view of a drilling device according to the present embodiment.

FIG. 1 is an exploded front view of the drilling device 1 according to the present embodiment. The drilling device 1 includes a shank 4 to which a rotary electric motor is connected at a rear end thereof and which is rotationally driven, a slide body 7 screwed to the shank 4, an elongated bit holder 8 swingably provided at a front end of the slide body 7, an elongated diameter-enlarging bit 35 detachably attached to the bit holder 8 from a front end of the bit holder 8, and a two-stage tubular guide sleeve 6 into which the slide body 7, the bit holder 8, and the diameter-enlarging bit 35 are fitted so as to be movable back and forth. The shank 4, the slide body 7, the bit holder 8, the diameter-enlarging bit 35, and the guide sleeve 6 are all made of metal. The slide body 7, the bit holder 8, the diameter-enlarging bit 35, and the guide sleeve 6 are provided coaxially with an axis L of the shank 4. The guide sleeve 6 has a long hole 60 opened at a rear end thereof for guiding front-back movement of the slide body 7. An outer screw 43 is provided at a front end of the shank 4, and a first recess 78 is formed at a rear end of the slide body 7. An inner screw 79 is formed on a peripheral surface of the first recess 78, and the inner screw 79 is screwed to the outer screw 43 of the shank 4. When the shank 4 rotates, the slide body 7 rotates with it. Note that the slide body 7 and the shank 4 are connected by being screwed together. However, instead of this, the slide body 7 and the shank 4 may be integrally formed.

Figure 2A:
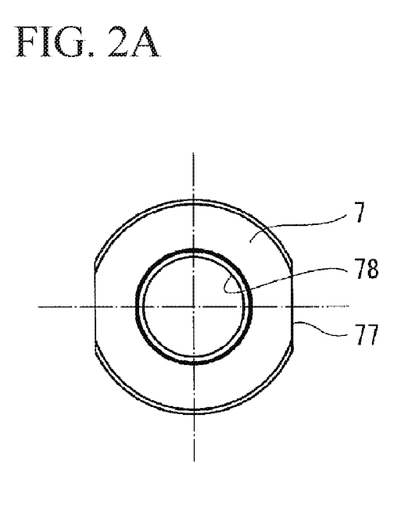
FIG. 2A is a plan view of a slide body.
Figure 2B:
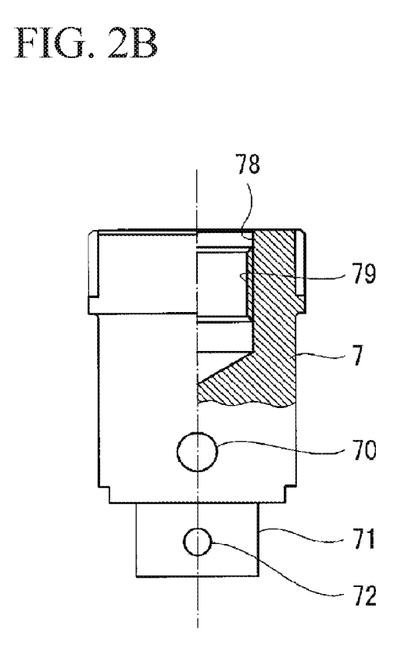
FIG. 2B is a front view in which a part of the slide body is cut away.
Figure 2C:
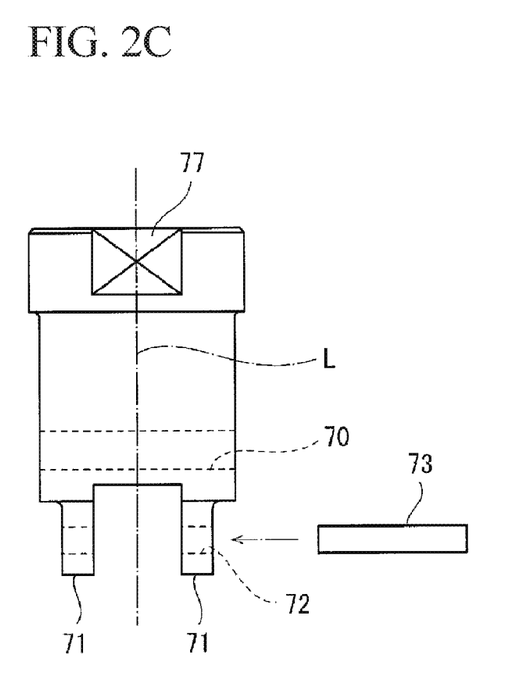
FIG. 2C is a right side view of FIG. 2B.

FIG. 2A is a plan view of the slide body 7, FIG. 2B is a front view in which a part of the slide body 7 is cut away, and FIG. 2C is a right side view of FIG. 2B. Since the rear end of the slide body 7 is screwed to the shank 4 as described above and a spanner is used at the time of screwing, a flat surface 77 for hanging the spanner is formed on a rear end peripheral surface of the slide body 7. A first through hole 70 orthogonal to the axis L is opened at the front end of the slide body 7, and a first pin (to be described later) is fitted through the long hole 60 of the guide sleeve 6 and the first through hole 70 in a state where the slide body 7 is fitted in the guide sleeve 6. A width of the long hole 60 is substantially equal to a diameter of the first pin. In the slide body 7, a pair of first support pieces 71 project forward in parallel with each other from a front end side of the first through hole 70, and each first support piece 71 has a second through hole 72 opened so as to be orthogonal to the axis L. A rear end of the bit holder 8 is fitted between both the first support pieces 71, and a third through hole 80 is opened at the rear end so as to be orthogonal to the axis L. A second pin 73 is fitted into the first support pieces 71 by penetrating both the second through holes 72 and the third through hole 80. Accordingly, the bit holder 8 is swingably provided on the slide body 7, and the bit holder 8 rotates together with the slide body 7.

Figure 3A:
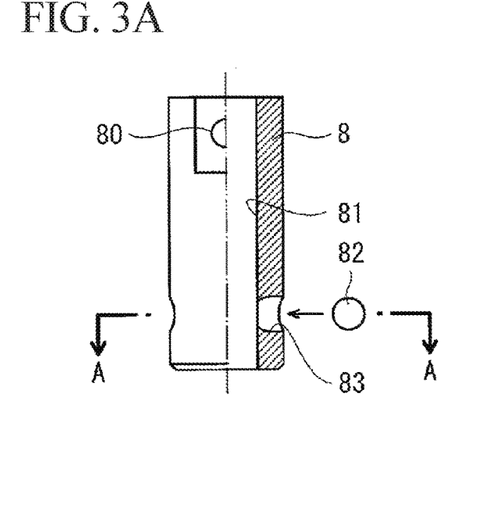
FIG. 3A is a front view of a bit holder.
Figure 3B:
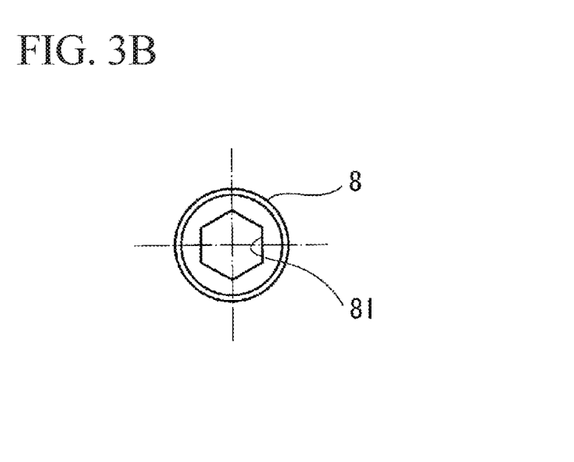
FIG. 3B is a bottom view of FIG. 3A.
Figure 3C:
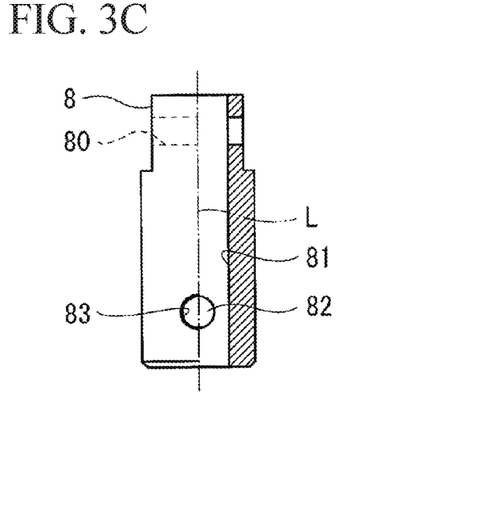
FIG. 3C is a right side view of FIG. 3A.
Figure 4:
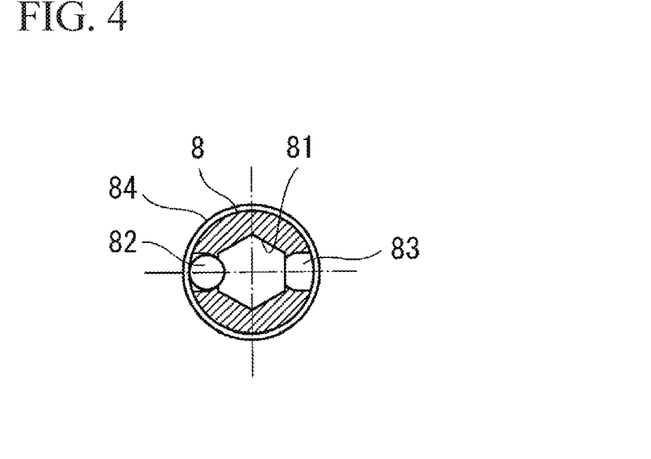
FIG. 4 is a cross-sectional view of the bit holder around which a ring is wound.

FIG. 3A is a front view of the bit holder 8, FIG. 3B is a bottom view of FIG. 3A, and FIG. 3C is a right side view of FIG. 3A. A center hole 81 that penetrates in a longitudinal direction is opened at the center of the bit holder 8. At the front end of the bit holder 8 and outside a peripheral wall of the center hole 81, a ball receiving recess 83 into which a steel ball 82 is fitted is provided from the outside, and a part of the steel ball 82 projects into the center hole 81 (see FIG. 4). The diameter-enlarging bit 35 is fitted as described above from the front of the center hole 81. The center hole 81 is formed in a hexagonal cross section, and a rear end of the diameter-enlarging bit 35 fitted in the center hole 81 is also formed in a hexagonal cross section correspondingly. As a result, the bit holder 8 and the diameter-enlarging bit 35 rotate integrally. Note that the center hole 81 need not have the hexagonal cross section as long as the bit holder 8 and the diameter-enlarging bit 35 can rotate integrally.

Further, in order to prevent the steel ball 82 from dropping from the ball receiving recess 83 and to bias the steel ball 82 inward toward the center hole 81, it is conceivable that a rubber ring 84 (FIG. 4) is wound around the ball receiving recess 83. However, a metal spring or the like may be wound instead of the rubber ring 84.

As shown in FIG. 1, from the rear end to the front end, the diameter-enlarging bit 35 is provided with a fitting part 36 that fits in the center hole 81 of the bit holder 8, a fitting recess 37 recessed toward the axis L, and a cutting blade 30 for enlarging a diameter. The steel ball 82 biased inward from the ball receiving recess 83 is fitted into the fitting recess 37. As a result, the diameter-enlarging bit 35 is supported by the bit holder 8.

Figure 5A:
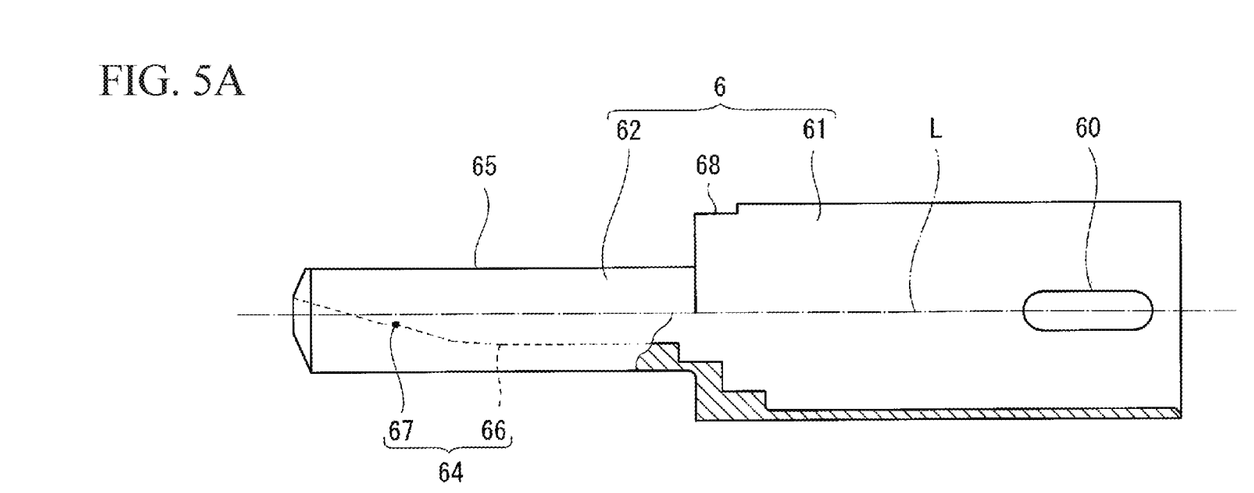
FIG. 5A is a front view of a guide sleeve.
Figure 5B:
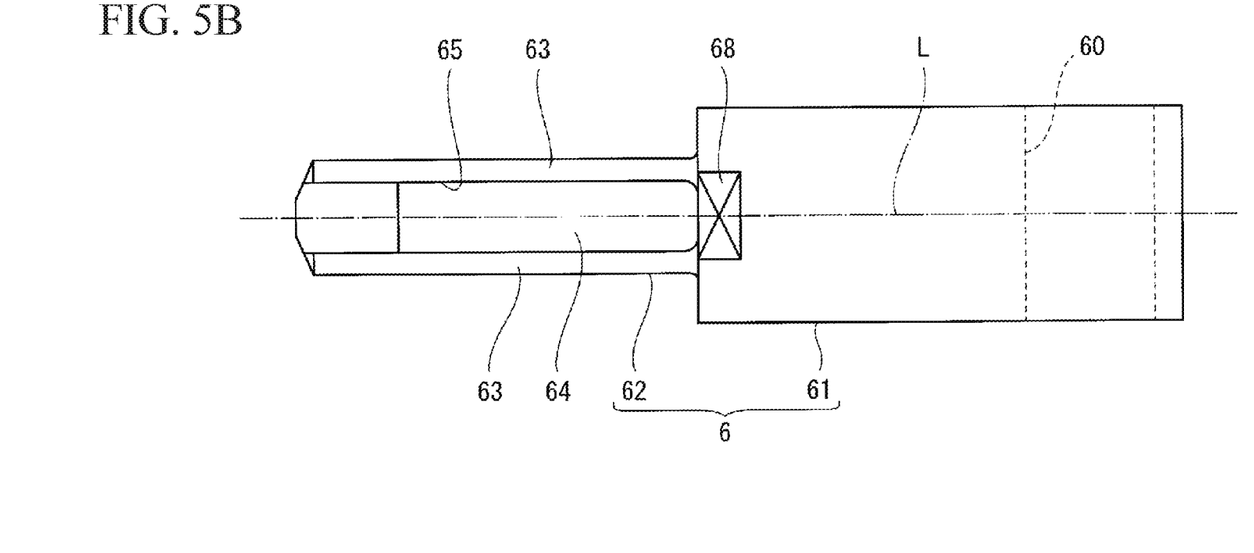
FIG. 5B is a plan view of FIG. 5A.

As shown in FIGS. 5A and 5B, a cylindrical body 61 having a cross section larger than that of the pore 92 described above and a guide 62 having a diameter narrower than a diameter of the cylindrical body 61 and fitting in the pore 92 are integrally provided in the guide sleeve 6. The guide 62 includes a pair of second support pieces 63 extending parallel to each other. One sides of both the second support pieces 63 are connected by a guide piece 64, and an opening 65 is formed on other sides thereof facing the guide piece 64. Note that the opening 65 is formed so as to extend to a front end of the guide sleeve 6.

The guide piece 64 is provided to guide front-back movement of the cutting blade 30 of the diameter-enlarging bit 35, and continuously includes a first surface 66 parallel to the axis L and a second surface 67 extended forward from a front end of the first surface 66 in a diagonally inward direction. Here, it is necessary that a direction in which the first surface 66 faces and a direction in which the long hole 60 penetrates are exactly orthogonal to each other, that is, phases of the first surface 66 and the long hole 60 are aligned. Since the first surface 66 and the long hole 60 are formed by metal cutting work or the like, a flat mark surface 68 is formed at a front end of the cylindrical body 61 as a mark at the time of the work. In other words, if the mark surface 68 is formed on the cylindrical body 61 upon formation of the first surface 66, by confirming the mark surface 68 upon opening of the long hole 60 next, the long hole 60 can be formed so that a penetration direction to the first surface 66 has a correct phase, that is, an angle of 90 degrees.

Figure 6A:
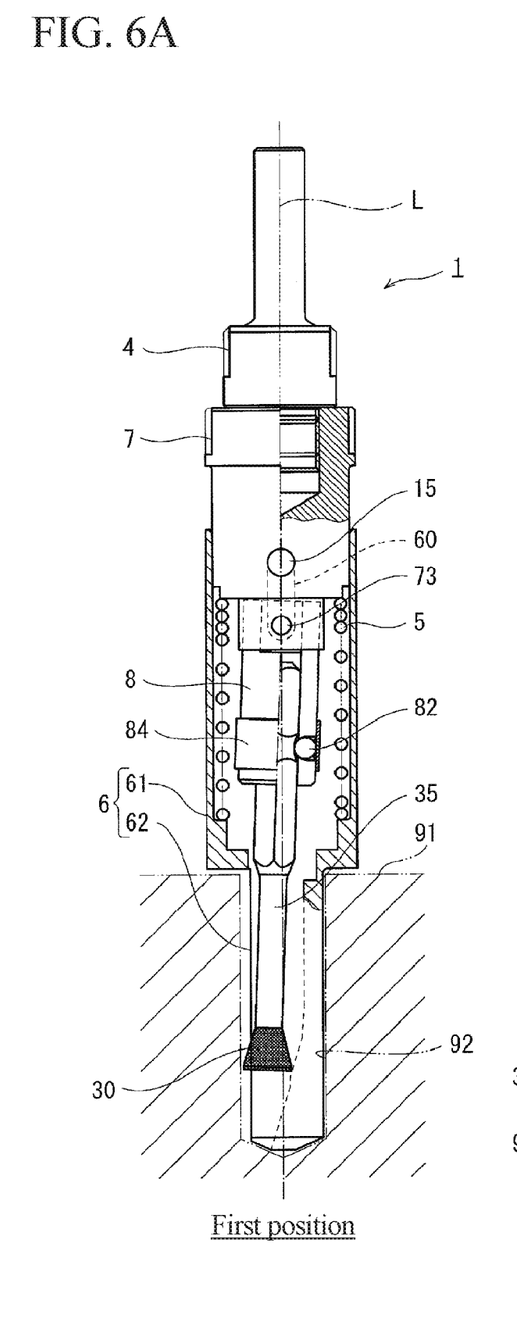
FIG. 6A is a front view showing a state in which the assembled drilling device is inserted into a pore.
Figure 6B:
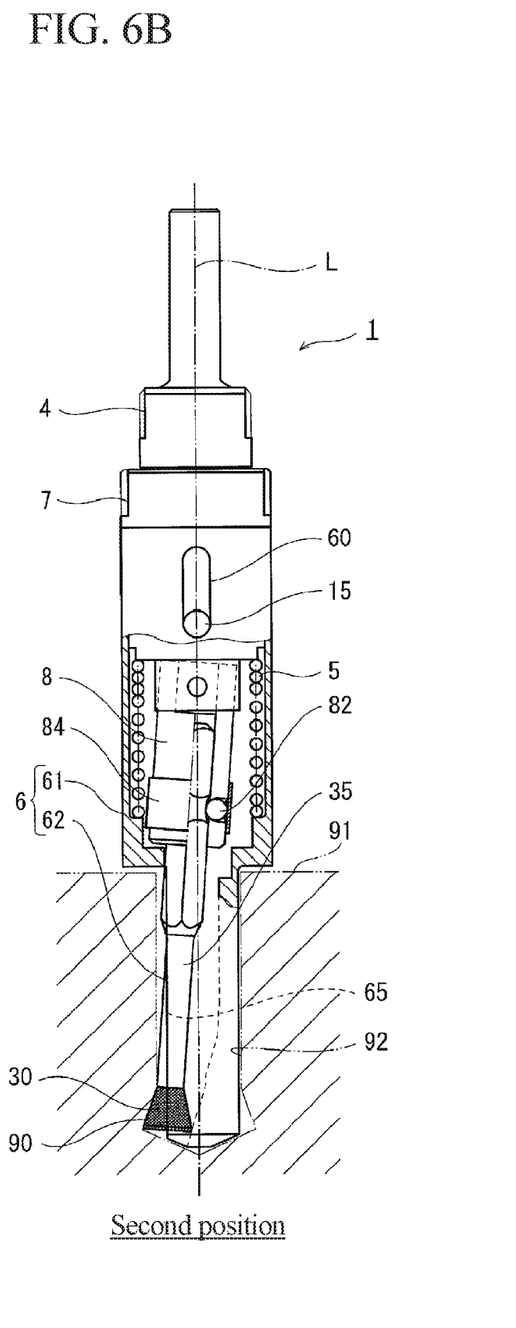
FIG. 6B is a front view showing a state in which an enlarged-diameter hole is formed.

FIG. 6A is a front view showing a state where the assembled drilling device 1 is inserted into the pore 92, that is, an unused state, and FIG. 6B is a front view showing a state where the enlarged-diameter hole 90 is formed. A first pin 15 is inserted into the long hole 60 from the outside of the guide sleeve 6, and the first pin 15 penetrates the first through hole 70 of the slide body 7. Since the first pin 15 is fitted in the guide sleeve 6 and the slide body 7, when the slide body 7 rotates due to the rotation of the shank 4, the guide sleeve 6 also rotates.

The guide 62 of the guide sleeve 6 is inserted into the pore 92, and the cylindrical body 61 is located outside the rear of the pore 92. A compression spring 5 is inserted into the cylindrical body 61 of the guide sleeve 6, and the slide body 7 and the shank 4 are biased upward by the compression spring 5. The first pin 15 corresponds to a rear end of a peripheral edge of the long hole 60, specifically, is in contact therewith, and a front-back movement amount of the slide body 7 is determined by a front-back length of the long hole 60. In the state shown in FIG. 6A, the bit holder 8 and the diameter-enlarging bit 35 are also biased upward, and the cutting blade 30 is located at a rear end of the second surface 67 apart from a bottom of the pore 92. At this point, the enlarged-diameter hole 90 is not yet formed. This position of the cutting blade 30 and the diameter-enlarging bit 35 is referred to as a first position.

At the Time of Drilling Work

When a worker attaches the rotary electric motor to the shank 4 and rotates the shank 4 by the rotary electric motor, the slide body 7, the bit holder 8, the diameter-enlarging bit 35, and the guide sleeve 6 also rotate. At this time, as shown in FIG. 6B, if the shank 4, the slide body 7, the bit holder 8, and the diameter-enlarging bit 35 are pushed forward against the compression spring 5, that is, toward the bottom of the pore 92, the cutting blade 30 moves outward along the second surface 67 (see FIG. 5A) and cuts a peripheral surface of the pore 92 through the opening 65. The first pin 15 corresponds to a front end of the peripheral edge of the long hole 60, specifically, is in contact therewith, and restricts forward movement of the slide body 7 and the diameter-enlarging bit 35. In this way, the enlarged-diameter hole 90 can be formed. This position of the cutting blade 30 and the diameter-enlarging bit 35 is referred to as a second position.

When the drilling device 1 is taken out from the mounting hole 9, the rotation and pushing of the shank 4 are stopped, and the pushing of the diameter-enlarging bit 35 forward is released. Due to biasing force of the compression spring 5, the diameter-enlarging bit 35 returns to the first position shown in FIG. 6A. Since the cutting blade 30 is not caught in the pore 92, the drilling device 1 can be taken out from the mounting hole 9.

When the cutting blade 30 is continuously used, it becomes necessary to replace the diameter-enlarging bit 35 due to wear or damage of the cutting blade 30. The invention according to the present embodiment is characterized by improving replacement workability of the diameter-enlarging bit 35.

Replacement Procedure for Diameter-Enlarging Bit

Figure 7:
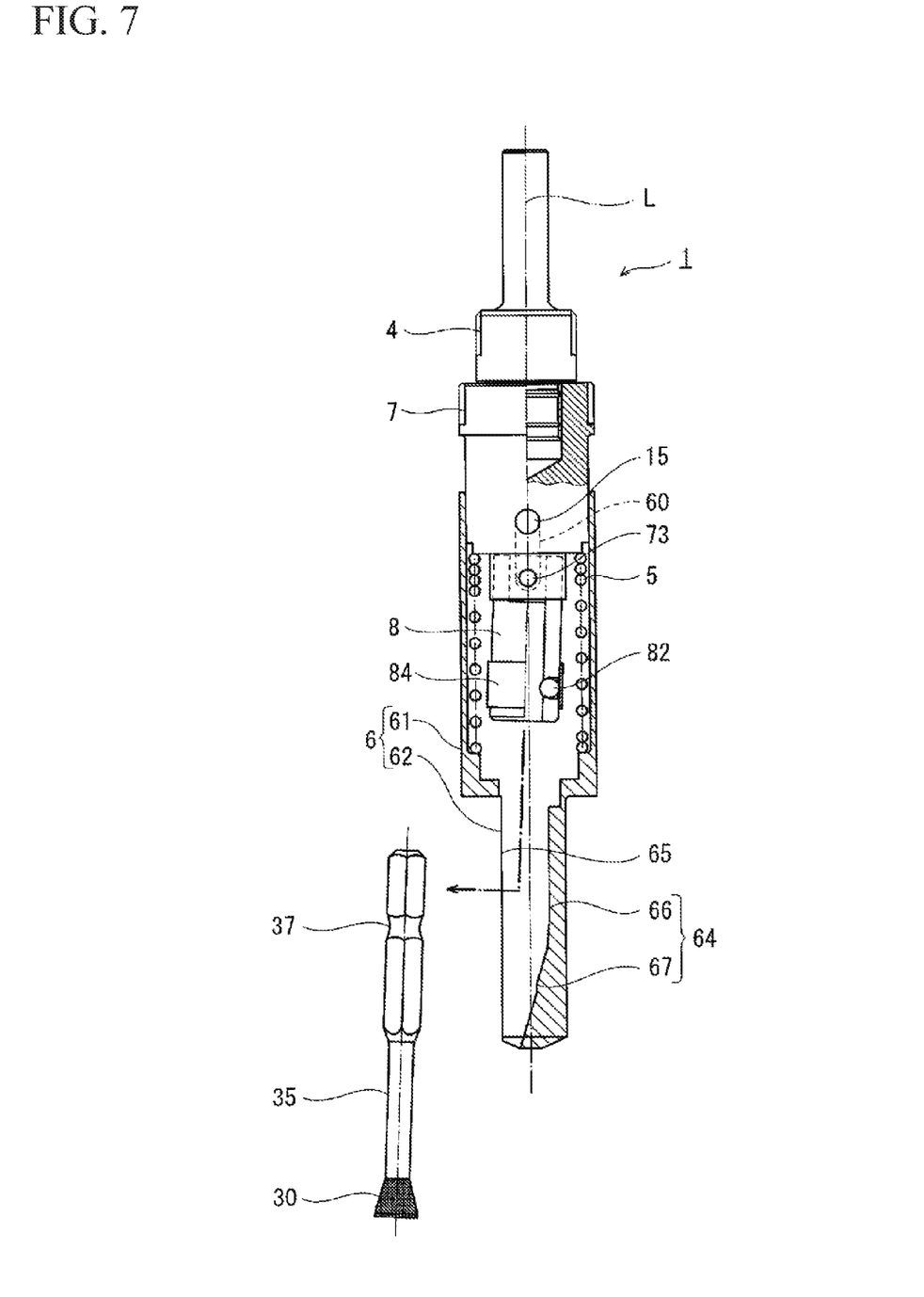
FIG. 7 is a front view showing work of replacing a diameter-enlarging bit.

As shown in FIG. 7, in a state in which the diameter-enlarging bit 35 is at the first position, an operator's hand or fingers is/are inserted through the opening 65 of the guide 62 to grasp the diameter-enlarging bit 35. The diameter-enlarging bit 35 is pulled out forward and removed from the opening 65 against fitting between the steel ball 82 of the bit holder 8 and the fitting recess 37. In other words, the opening 65 is formed in a size that allows the diameter-enlarging bit 35 removed from the bit holder 8 to pass through at the first position.

Next, a replacement diameter-enlarging bit 35 is inserted through the opening 65, a rear end of the diameter-enlarging bit 35 is inserted from the front of the bit holder 8, and the fitting recess 37 is fitted to the steel ball 82. Then, replacement of the diameter-enlarging bit 35 is completed. Note that the diameter-enlarging bit 35 may be replaced in a state in which the diameter-enlarging bit 35 is at the second position.

In the drilling device 1 according to the present embodiment, the diameter-enlarging bit 35 can be replaced only by setting the diameter-enlarging bit 35 to the first position and attaching and detaching the diameter-enlarging bit 35 to and from the bit holder 8 through the opening 65. As a result, the diameter-enlarging bit 35 can be quickly replaced, and the drilling work can be made efficient. Note that it is possible to use a generally commercially available bit as the diameter-enlarging bit 35.

Further, a fitting structure of the diameter-enlarging bit 35 and the bit holder 8 is not limited to the above. Any structure may be used as long as the recess of the diameter-enlarging bit 35 and the projection of the bit holder 8 are fitted together. Furthermore, a structure may be adopted in which a projection provided in the diameter-enlarging bit 35 and a recess provided in the bit holder 8 are fitted together. In short, it is sufficient if the diameter-enlarging bit 35 is detachable from the bit holder 8.

From the above description, many modifications and other embodiments of the present invention will be apparent to those skilled in the art. Therefore, the above description should be construed as illustrative only and is provided for the purpose of teaching those skilled in the art the best mode for carrying out the present invention. It goes without saying that details of its structure and/or function can be changed substantially without departing from the spirit of the invention.

INDUSTRIAL APPLICABILITY

The present invention is useful when applied to a drilling device for forming an enlarged-diameter hole.

REFERENCE CHARACTERS LIST 1 drilling device
4 shank
5 compression spring
6 guide sleeve
7 slide body
8 bit holder
9 mounting hole
30 cutting blade
35 diameter-enlarging bit
65 opening

The invention claimed is:

1. A drilling device for forming an enlarged-diameter hole in a deep bottom of a bottomed hole opened in an object to be drilled, the drilling device comprising:
 a guide sleeve including a guide to be inserted into the bottomed hole and a cylindrical body continuous with the guide;
 a slide body provided so as to be movable back and forth in the cylindrical body;
 a bit holder located in front of the slide body and provided on the slide body so as to be swingable in the cylindrical body; and
 a diameter-enlarging bit located in front of the bit holder, detachably fitted to the bit holder, and provided with a cutting blade at a front end, wherein
 following the back and forth movement of the slide body, the diameter-enlarging bit is provided so as to be movable back and forth between a first position at which the cutting blade is separated from a bottom of the bottomed hole and a second position at which the cutting blade is closer to the bottom of the bottomed hole than the cutting blade at the first position,
 the guide has a guide piece that guides the cutting blade to a side surface part, of the bottomed hole, corresponding to the enlarged-diameter hole following an advance of the diameter-enlarging bit from the first position to the second position, and an opening formed with a size allowing passage of the diameter-enlarging bit beyond the opening of the guide, and
 a center hole extending in a longitudinal direction of the bit holder is opened in the bit holder, and the bit holder is detachably fitted on the diameter-enlarging bit by fitting the diameter-enlarging bit in the center hole and by fitting a ball provided inside a periphery of the bit holder and biased toward the center hole into a recess formed in the diameter-enlarging bit.

2. The drilling device according to claim 1, wherein a long hole extending in a front-rear direction is opened in the cylindrical body, a pin fitted into the slide body is inserted from outside of the guide sleeve through the long hole, and a position at which the pin corresponds to a rear end of the long hole corresponds to the first position and a position at which the pin corresponds to a front end of the long hole corresponds to the second position.

3. The drilling device according to claim 1, further comprising a shank coupled to the slide body and rotationally driven by an electric motor.

4. The drilling device according to claim 3, wherein the slide body and the shank are connected by being screwed together or integrally formed.

* * * * *